UNITED STATES PATENT OFFICE.

WILLIAM P. CLOTWORTHY, OF BALTIMORE, MARYLAND.

BAKING-POWDER.

SPECIFICATION forming part of Letters Patent No. 273,958, dated March 13, 1883.

Application filed December 7, 1882. (No specimens.)

*To all whom it may concern:*

Be it known that I, WILLIAM PITT CLOTWORTHY, a citizen of the United States, residing at the city of Baltimore, in the State of Maryland, have invented a new and useful composition of matter as a Baking-Powder, to be used in bread-making, of which composition the following is a specification.

My said invention relates to that class of compounds known as "baking-powders," and used as a substitute for yeast to aerate dough for the various kinds of bread—such as loaves, rolls, cakes, and similar articles of food—as will readily be understood, and substantially as particularized in my patent for an improvement in baking-powders, No. 206,930, dated August 13, 1878.

My composition consists of the following-mentioned ingredients, combined in the proportions stated, viz: one and a half part of tartrate of alumina; one part of bicarbonate of soda; one part of starch or flour.

In use I take two teaspoonfuls of the composition to a pound of flour.

What I claim as new, and desire to secure by Letters Patent of the United States, is—

A baking-powder composed of tartrate of alumina, bicarbonate of soda, and starch or flour, substantially in the proportions and for the purpose above specified.

W. PITT CLOTWORTHY.

Witnesses:
LOUIS HORPEL,
ALLEN THOMAS.